(12) United States Patent
Ritchey

(10) Patent No.: US 10,538,659 B2
(45) Date of Patent: Jan. 21, 2020

(54) UV GRAFT ON MICROFLUIDIC DEVICES

(71) Applicant: Bio-Rad Laboratories, Inc., Hercules, CA (US)

(72) Inventor: Joshua Ritchey, Melrose, MA (US)

(73) Assignee: Bio-Rad Laboratories, Inc., Hercules, CA (US)

(*) Notice: Subject to any disclaimer, the term of this patent is extended or adjusted under 35 U.S.C. 154(b) by 129 days.

(21) Appl. No.: 15/847,762

(22) Filed: Dec. 19, 2017

(65) Prior Publication Data
US 2018/0171133 A1   Jun. 21, 2018

Related U.S. Application Data

(60) Provisional application No. 62/436,831, filed on Dec. 20, 2016.

(51) Int. Cl.
*C08L 51/00* (2006.01)
*B01J 19/12* (2006.01)
*C08L 23/08* (2006.01)

(52) U.S. Cl.
CPC ............ *C08L 51/003* (2013.01); *B01J 19/124* (2013.01); *C08L 23/08* (2013.01); *C08L 2205/02* (2013.01)

(58) Field of Classification Search
CPC ....... C08L 51/003; C08L 23/08; B01J 19/124; B01J 19/0093; B01J 2219/0084; C08J 7/18; C08J 2365/00; C08J 2433/16
USPC ........................................................ 526/72
See application file for complete search history.

(56) References Cited

U.S. PATENT DOCUMENTS 7,431,888 B2 * 10/2008 Frechet ............ B01L 3/502707
204/454
2001/0002416 A1   5/2001 Matakawa et al.

FOREIGN PATENT DOCUMENTS

| CN | 102964544 A | 3/2013 | |
|----|-------------|--------|---|
| WO | 2006/023795 A2 | 3/2006 | |
| WO | WO-2006023795 A2 * | 3/2006 | ............. A61K 38/16 |

OTHER PUBLICATIONS

D. Alaimo et al. "Block, random and palm-tree amphiphilic fluorinated copolymers; controlled synthesis, surface activity and use as dispersion polymerization stabilizers", Polymer Chemistry, vol. 5, May 9, 2014, pp. 1-11 (Year: 2014).*

Alaimo et al.; "Block, random and palm-tree amphiphilic fluorinated copolymers: controlled synthesis, surface activity and use as dispersion polymerization stabilizers", Polymer Chemistry, vol. 5, 2014, pp. 1-11 (Year: 2014).*

(Continued)

*Primary Examiner* — Michael Bernshteyn
(74) *Attorney, Agent, or Firm* — Kilpatrick Townsend and Stockton LLP

(57) ABSTRACT

Compositions, devices, and methods are disclosed for the covalent modification of polymer surfaces with graft copolymers having a blend of side chains. The halogenated acrylic and polyalkylene glycol acrylic side chains of the graft copolymer provide the polymer surface with high hydrophobicity, as well as increased resistance to biofouling with proteinaceous material. The polymer surfaces can be particularly useful in microfluidic devices and methods that involve the contacting of the covalently modified polymer surfaces with emulsions of aqueous droplets containing biological macromolecules within an oil carrier phase.

19 Claims, 3 Drawing Sheets

(56) References Cited

OTHER PUBLICATIONS

Ardhaoui et al.; "Evaluation of cell behavior on atmospheric plasma deposited siloxane and fluorosiloxane coatings", Journal of Adhesion Science and Technology, vol. 24, 2012, pp. 1-9 (Year: 2012).*

International Search Report and Written Opinion in PCT/US2017/067397; dated Mar. 26, 2018; 9 pages.

Alaimo, D. et al.; "Block, random and palm-tree amphiphilic fluorinated copolymers: controlled synthesis, surface activity and use as dispersion polymerization stabilizers"; *Polymer Chemistry*; vol. 5; May 9, 2014; pp. 1-11.

Ardhaoui, M. et al.; "Evaluation of cell behavior on atmospheric plasma deposited siloxane and fluorosiloxane coatings"; *Journal of Adhesion Science and Technology*; vol. 24; Apr. 2, 2012; pp. 1-9.

Dudek, M.M. et al.; "Plasma Surface Modification of Cyclo-olefin Polymers and Its Application to Lateral Flow Bioassays"; *Langmuir*; vol. 25, No. 18; Sep. 7, 2009; pp. 11155-11161.

Gandhiraman, R.P. et al.; "High efficiency amine functionalization of cycloolefin polymer surfaces for biodiagnostics"; *Journal of Materials Chemistry*; vol. 20; Apr. 13, 2010; pp. 4116-4127.

Jena, R.K. et al.; "Improvement of thermal bond strength and surface properties of Cyclic Olefin Copolymer (COC) based microfluidic device using the photo-grafting technique"; *Sensors and Actuators B; Chemical*; vol. 157; May 13, 2011; pp. 518-526.

Jena, R.K. et al.; "Cyclic olefin copolymer based microfluidic devices for biochip applications: Ultraviolet surface grafting using 2-methacryloyloxyethyl phosphorylcholine"; *Biomicrofluidics*; vol. 6; No. 012822; Mar. 15, 2012; pp. 012822-1-012822-12.

Rohr, T. et al.; "Surface Functionalization of Thermoplastic Polymers for the Fabrication of Microfluidic Devices by Photoinitiated Grafting"; *Advanced Functional Materials*; vol. 13, No. 4; Apr. 2003; pp. 264-270.

Wang, B. et al.; "Surface Wettability Modification of Cyclic Olefin Polymer by Direct Femtosecond Laser Irradiation"; *Nanomaterials*; vol. 5; Aug. 28, 2015; pp. 1442-1453.

Yue, C.Y. et al.; "Surface Modification and Thermal Bonding in COC Polymeric Microfluidic Chip"; *AIJSTPME*; vol. 6, No. 2; 2013; pp. 33-38.

* cited by examiner

UV GRAFT ON MICROFLUIDIC DEVICES

CROSS-REFERENCE TO RELATED APPLICATIONS

The present application claims benefit of priority to U.S. Provisional Patent Application No. 62/436,831, filed Dec. 20, 2016, the entire contents of which is incorporated herein by reference in its entirety.

BACKGROUND

The interfacial surface tension of cyclic olefin polymer (COP) and cyclic olefin copolymer (COC) microfluidic devices is relevant, for example, for droplet-based microfluidic applications in which aqueous droplets are manipulated within a perfluorinated or silicone based oil. The surface tension properties of materials can often be altered through the adjustment of surface chemistries. Unfortunately, the relative non-reactivity of the COP and COC substrates commonly used in microfluidic devices makes their surface modification difficult or in some cases impossible.

Previous efforts to improve microfluidic device surface tensions have focused on silane modification of the COP and COC substrates (Zhou (2010) *Electrophoresis* 31:2; Gandhiraman (2010) *J. Mater. Chem.* 20:4116; and Dudek (2009) *Langmuir* 25:11155). This approach was found to produce surfaces having inconsistent quality and performance, presumably because the silane was not covalently attached to the substrates. Instead, the silanes most likely pre-hydrolyse in solution, as a network polymer is physisorbed onto the COP/COC substrate.

A recent alternate technique for modifying the surface of COP and COC substrates involves UV-graft polymerization on monolith structures within microfluidic channels (U.S. Pat. No. 7,431,888). The use of a benzophenone photoinitiator in the presence of a solution phase of monomer allows COP and COC substrates to be covalently modified with a multitude of monomers of both acrylate and methacrylate functionality. These monomers could also be terminated with fluorophilic, hydrophobic, hydrophilic, and formally charged groups.

BRIEF SUMMARY

For some microfluidic applications, it is desirable that the microfluidic surfaces be not only hydrophobic, but also non-biofouling. In this way, the surfaces within the microfluidic devices can better resist the accumulation of proteinaceous material from aqueous phase droplets. Additionally, there can be a benefit to producing surfaces having these surface properties through methods that generate robust covalent attachments.

In general, provided herein are compositions, devices, and methods that are characterized by the covalent modification of a surface with a graft copolymer. The graft copolymer includes a mixture of monomers found to produce the desired surface properties of a high water contact angle and a low susceptibility to biofouling. The improved resistance of the surface to biofouling allows the surface to maintain excellent hydrophobic characteristics even after exposure to protein solutions that can otherwise impact surface tensions. Additionally, the covalent attachment of the graft copolymer to the surface substrate produces a more robust and less variable surface.

One provided covalently modified polymer surface includes a graft copolymer, wherein the graft copolymer includes a backbone polymer, a polyalkylene glycol acrylic side chain, and a fluorinated acrylic side chain. The covalently modified polymer surface has a water contact angle of greater than 100°, and this water contact angle changes by less than 10° upon exposure to an aqueous 1 mg/mL bovine serum albumin solution for 1 hour.

In some embodiments, the backbone polymer is a cyclic olefin polymer (COP) or cyclic olefin copolymer (COC). In some embodiments, the backbone polymer is a COP. In some embodiments, the backbone polymer is a COC. In some embodiments, the fluorinated acrylic side chain includes a perfluorinated alkyl acrylate or a perfluorinated alkyl methacrylate. In some embodiments, the fluorinated acrylic side chain includes 1H,1H,2H,2H-perfluorodecyl acrylate. In some embodiments, the polyalkylene glycol acrylic side chain includes polyethylene glycol acrylate. In some embodiments, the number average molecular weight of the polyalkylene glycol acrylic side chain is within the range from 150 to 1500. In some embodiments, the mass ratio of fluorinated acrylic side chain to polyalkylene glycol acrylic side chain is within the range from 1:3 to 3:1. In some embodiments, the backbone polymer is a COC, the polyalkylene glycol acrylic side chain includes polyethylene glycol acrylate, and the fluorinated acrylic side chain includes a perfluorinated alkyl acrylate.

Also provided is a device including a microfluidic channel having an interior surface, wherein the interior surface includes a covalently modified polymer surface that is in accordance with an embodiment.

Also provided is a method of moving an emulsion of droplets through a microfluidic channel, the method including providing a device that is in accordance with an embodiment. The method further includes providing an emulsion including droplets and an emulsion fluid. The method further includes providing a force sufficient to move the emulsion through the microfluidic channel of the device.

In some embodiments, the droplets are aqueous droplets including nucleic acids and reagents sufficient for a polymerase chain reaction. In some embodiments, the emulsion fluid includes a fluorinated oil or a silicone oil.

Also provided is a method for producing a covalently modified polymer surface, the method including contacting a polymer surface with a mixture including a polyalkylene glycol acrylate, a fluorinated acrylic monomer, an organic solvent, and a photoinitiator. The method further includes exposing the polymer surface and mixture to ultraviolet (UV) radiation, such that the polymer surface is covalently modified.

In some embodiments, the backbone polymer is a COP or COC. In some embodiments, the backbone polymer is a COP. In some embodiments, the backbone polymer is a COC. In some embodiments, the fluorinated acrylic side chain includes a perfluorinated alkyl acrylate or a perfluorinated alkyl methacrylate. In some embodiments, the fluorinated acrylic side chain includes 1H,1H,2H,2H-perfluorodecyl acrylate. In some embodiments, the polyalkylene glycol acrylate includes polyethylene glycol acrylate. In some embodiments, the number average molecular weight of the polyalkylene glycol acrylate is within the range from 150 to 1500. In some embodiments, the mass concentration ratio of polyalkylene glycol acrylate to fluorinated acrylic monomer in the mixture is within the range from 1:3 to 3:1. In some embodiments, the organic solvent includes acetone. In some embodiments, the polymer surface includes a COC, wherein the polyalkylene glycol acrylate includes polyethylene glycol acrylate, and wherein the fluorinated acrylic monomer includes a perfluorinated alkyl acrylate.

In some embodiments, the mixture further includes 3-ethoxy-1,1,1,2,3,4,4,5,5,6,6,6-dodecafluoro-2-trifluoromethyl-hexane. In some embodiments, the photoinitiator includes benzophenone. In some embodiments, the concentration of the photoinitiator in the mixture is within the range from 125 mg/mL to 1.3 mg/L. In some embodiments, the UV radiation has a wavelength within the range from 325 nm to 400 nm. In some embodiments, the UV radiation has a dose within the range from 0.8 mW to 8 mW.

In some embodiments, the modified polymer surface has a water contact angle of greater than 100°. In some embodiments, the modified polymer surface has a water contact angle that changes by less than 10° upon exposure to an aqueous 1 mg/mL bovine serum albumin solution for 1 hour. In some embodiments, the polymer surface is the interior surface of a microfluidic channel.

DETAILED DESCRIPTION

I. General

Figure 1:
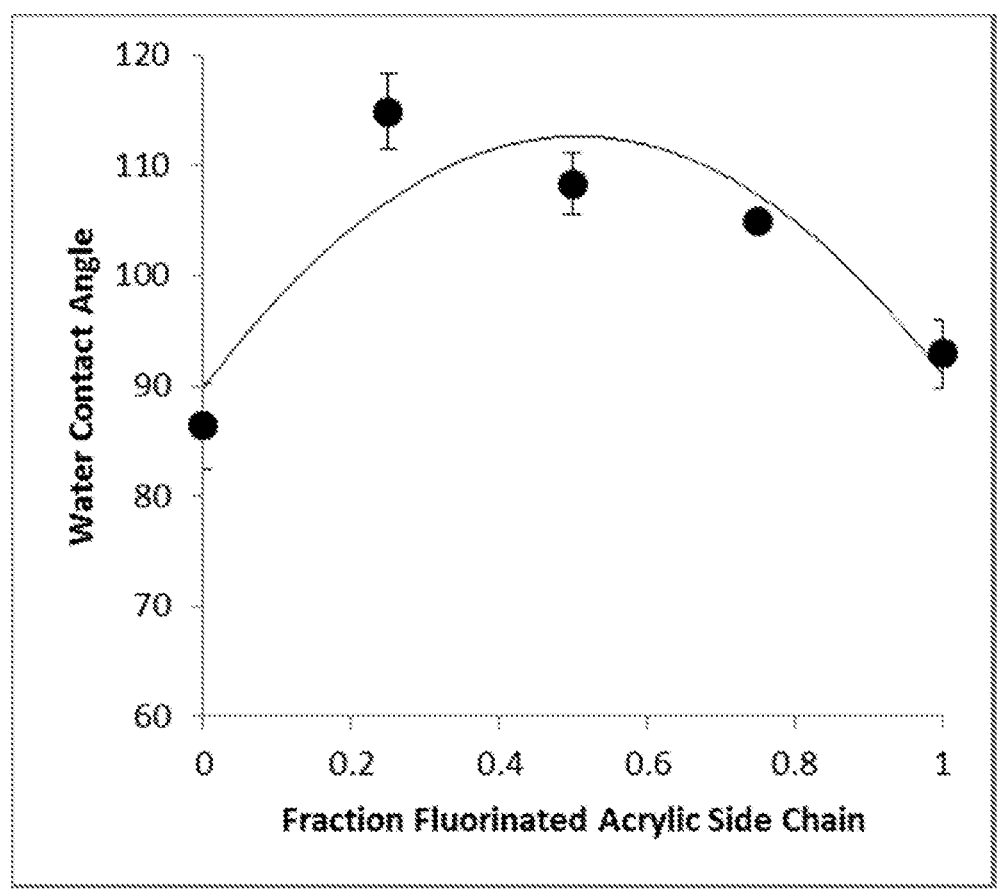
FIG. 1 is a graph of the water contact angles for several polymer surfaces covalently modified with a graft copolymer in accordance with embodiments. Each point on the graph represents a surface having a different fraction of its graft copolymer side chains as fluorinated acrylic side chains. Error bars represent standard deviations of triplicate measurements for each surface.

The present invention provides covalently modified polymer surfaces that have a high water contact angle and a high resistance to degradation or fouling upon exposure to protein solutions. The inventors have discovered that particular copolymer compositions and attachment methods are capable of providing a robust surface modification that improves interfacial surface tension and biofouling resistance. The present invention also provides microfluidic devices having an interior surface that includes a provided covalently modified polymer surface, methods of moving an emulsion of droplets through a microfluidic channel of a provided microfluidic device, and methods for producing the provided covalently modified polymer surfaces.

II. Definitions

Unless defined otherwise, technical and scientific terms used herein have the same meaning as commonly understood by a person of ordinary skill in the art. Methods, devices, and materials similar or equivalent to those described herein can be used in the practice of this invention. The following definitions are provided to facilitate understanding of certain terms used frequently and are not meant to limit the scope of the present disclosure. Abbreviations used herein have their conventional meaning within the chemical and biological arts.

"Polymer" refers to an organic substance composed of a plurality of repeating structural units (monomeric units) covalently linked to one another.

"Copolymer" refers to a polymer derived from two or more monomeric species, as opposed to a homopolymer where only one monomer is used. For example, given monomeric species A and B, an alternating copolymer can have the form of -A-B-A-B-A-B-A-B-A-B-. As an alternate example, given monomeric species A and B, a random copolymer can have the form of -A-A-B-A-B-B-A-B-A-A-A-B-B-B-B-A-. As another example, given monomeric species A and B, a block copolymer can have the form of -(A-A-A)-(B-B-B)-(A-A-A)-(B-B-B)-(A-A-A)-.

"Graft copolymer" refers to a copolymer having a backbone or main chain to which side chains of a different chemical composition are attached at various positions along the backbone. For example, the backbone can be formed of a first polymer, and the side chains can be formed of a second polymer, wherein the first polymer and the second polymer have different chemical compositions. The side chains can be grafted or attached at various positions along the backbone by covalent bonding to form the graft copolymer. The side chains of the graft copolymer can comprise constitutional or configurational features that differ from those in the main chain, or backbone polymer.

"Backbone polymer" refers to a linear polymer chain from which all other side chains are regarded as being pendant.

"Side chain" refers to portions of a polymer that append from the backbone.

"Alkyl" refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Alkyl can also refer to alkyl groups having up to 20 carbons atoms, such as, but not limited to heptyl, octyl, nonyl, decyl, etc. Alkyl groups can be substituted or unsubstituted.

"Alkylene" refers to a straight or branched, saturated, aliphatic radical having the number of carbon atoms indicated, and linking at least two other groups, i.e., a divalent hydrocarbon radical. The two moieties linked to the alkylene can be linked to the same atom or different atoms of the alkylene group. For instance, a straight chain alkylene can be the bivalent radical of $-(CH_2)_n-$, where n is 1, 2, 3, 4, 5 or 6. Representative alkylene groups include, but are not limited to, methylene, ethylene, propylene, isopropylene, butylene, isobutylene, sec-butylene, pentylene and hexylene. Alkylene groups can be substituted or unsubstituted.

"Polyalkylene glycol" refers to straight or branched polyethylene glycol, polypropylene glycol, polybutylene glycol, and derivatives thereof. An exemplary embodiment of a polyalkylene glycol derivative is adipate dihydrazide-methyoxy-polyethylene glycol. Other examples include monoalkyl polyalkylene glycol acrylics, methoxypoly(ethylene glycol) (mPEG), poly(tetramethylene glycol), poly (ethylene oxide-co-propylene oxide), or copolymers and combinations thereof.

"Halogen" refers to fluorine, chlorine, bromine and iodine.

"Contact angle" refers to an angle formed between a horizontal solid surface and the liquid surface of a droplet maintaining a certain lens shape when placed on the solid surface The contact angle is characteristic of the liquid and solid surface properties.

"Emulsion" refers to a mixture of two or more fluids that are normally immiscible. An emulsion can include a first phase in a second phase, such as an aqueous phase in an oil phase. In some cases, an emulsion includes more than two phases. An emulsion can include particulates that function to stabilize the emulsion, and/or function as a coating, such as a droplet skin.

"Oil" refers to any liquid compound or mixture of liquid compounds that is immiscible with water and that has the majority of its molecular weight in the form of carbon. In some examples, oil also has a high content of hydrogen, fluorine, silicon, oxygen, or any combination thereof, among others.

"Droplet" refers to small volume of liquid, typically with a spherical shape, encapsulated by an immiscible fluid, such as a continuous phase or carrier liquid of an emulsion. The volume of a droplet, and/or the average volume of droplets in an emulsion can be, for example, less than one microliter (i.e., a "microdroplet"), less than one nanoliter, or less than one picoliter, among others. A droplet can have a diameter (or the droplets in an emulsion can have an average diameter) of less than 1000, 100, or 10 micrometers, among others. A droplet can be spherical or nonspherical. A droplet can be a simple droplet or a compound droplet, that is, a droplet in which at least one droplet encapsulates at least one other droplet. Droplets generated from an orifice can be monodisperse (composed of droplets of at least generally uniform size) or polydisperse.

The droplets of an emulsion can have any uniform or non-uniform distribution in the continuous phase. If non-uniform, the concentration of the droplets can vary to provide one or more regions of higher droplet density and one or more regions of lower droplet density in the continuous phase. For example, droplets can sink or float in the continuous phase, can be clustered in one or more packets along a channel, can be focused toward the center or perimeter of a flow stream, or the like.

"Microfluidic channel" refers to a channel or vessel, typically no more than five millimeters across in its narrowest dimension, for carrying or holding a fluid.

"Nucleic acid" or "polynucleotide" refers to deoxyribonucleic acids (DNA) or ribonucleic acids (RNA) and polymers thereof in either single- or double-stranded form. Unless specifically limited, the term encompasses nucleic acids containing known nucleotide analogs or modified backbone residues or linkages, which are synthetic, naturally occurring, and non-naturally occurring, that have similar binding properties as the reference nucleic acid and are metabolized in a manner similar to reference nucleotides. Examples of such analogs include, without limitation, phosphorothioates, phosphoramidates, methyl phosphonates, chiral-methyl phosphonates, 2-O-methyl ribonucleotides, and peptide nucleic acids (PNAs). Unless otherwise indicated, a particular nucleic acid sequence also implicitly encompasses conservatively modified variants thereof (e.g., degenerate codon substitutions), alleles, orthologs, single nucleotide polymorphisms (SNPs), and complementary sequences, as well as the sequence explicitly indicated. Specifically, degenerate codon substitutions may be achieved by generating sequences in which the third position of one or more selected (or all) codons is substituted with mixed-base and/or deoxyinosine residues (Batzer et al., 1991) *Nucleic Acid Res.* 19:5081; Ohtsuka et al., (1985) *J. Biol. Chem.* 260:2605; and Rossolini et al., (1994) *Mol. Cell. Probes* 8:91).

Non-limiting examples of polynucleotides or nucleic acids include DNA, RNA, coding or noncoding regions of a gene or gene fragment, intergenic DNA, loci (locus) defined from linkage analysis, exons, introns, messenger RNA (mRNA), transfer RNA (tRNA), ribosomal RNA (rRNA), short interfering RNA (siRNA), short-hairpin RNA (shRNA), micro-RNA (miRNA), small nucleolar RNA (snoRNA), ribozymes, deoxynucleotides (dNTPs), or dideoxynucleotides (ddNTPs). Polynucleotides can also include complementary DNA (cDNA), which is a DNA representation of mRNA, usually obtained by reverse transcription of messenger RNA (mRNA) or by amplification. Polynucleotides can also include DNA molecules produced synthetically or by amplification, genomic DNA (gDNA), recombinant polynucleotides, branched polynucleotides, plasmids, vectors, isolated DNA of any sequence, isolated RNA of any sequence, nucleic acid probes, or primers. A polynucleotide can comprise modified nucleotides, such as methylated nucleotides and nucleotide analogs. If present, modifications to the nucleotide structure can be imparted before or after assembly of the polymer. The sequence of nucleotides can be interrupted by non-nucleotide components. A polynucleotide can be further modified after polymerization, such as by conjugation with a labeling component. Polynucleotide sequences, when provided, are listed in the 5' to 3' direction, unless stated otherwise.

Nucleic acids or polynucleotides can be double- or triple-stranded nucleic acids, as well as single-stranded molecules. In double- or triple-stranded nucleic acids, the nucleic acid strands need not be coextensive, for example, a double-stranded nucleic acid need not be double-stranded along the entire length of both strands.

Nucleic acid modifications can include addition of chemical groups that incorporate additional charge, polarizability, hydrogen bonding, electrostatic interaction, and functionality to the individual nucleic acid bases or to the nucleic acid as a whole. Such modifications include base modifications such as 2'-position sugar modifications, 5-position pyrimidine modifications, 8-position purine modifications, modifications at cytosine exocyclic amines, substitutions of 5-bromo-uracil, backbone modifications, unusual base pairing combinations such as the isobases isocytidine and isoguanidine, and the like.

Nucleic acid(s) can be derived from a completely chemical synthesis process, such as a solid phase-mediated chemical synthesis, from a biological source, such as through isolation from any species that produces nucleic acid, or from processes that involve the manipulation of nucleic acids by molecular biology tools, such as DNA replication, PCR amplification, reverse transcription, or from a combination of those processes.

"Reaction" refers to a chemical reaction, a binding interaction, a phenotypic change, or a combination thereof, which generally provides a detectable signal (e.g., a fluorescence signal) indicating occurrence and/or an extent of occurrence of the reaction. An exemplary reaction is an enzyme reaction that involves an enzyme-catalyzed conversion of a substrate to a product.

"Polymerase chain reaction" or "PCR" refers to a method whereby a specific segment or subsequence of a target double-stranded DNA is amplified in a geometric progression. PCR is well known to those of skill in the art; See, e.g., U.S. Pat. Nos. 4,683,195 and 4,683,202; and PCR Protocols: A Guide to Methods and Applications, Innis et al., eds, 1990.

Exemplary PCR reaction conditions typically comprise either two- or three-step cycles. Two-step cycles have a denaturation step followed by a hybridization/elongation step. Three-step cycles comprise a denaturation step followed by a hybridization step followed by a separate elongation step. PCR can be performed as end-point PCR (only monitored at an end point) or as quantitative PCR (monitored in "real time").

"Polymerase" refers to an enzyme that performs template-directed synthesis of polynucleotides. The term encompasses both a full length polypeptide and a domain that has polymerase activity. DNA polymerases are well-known to those skilled in the art, and include but are not limited to DNA polymerases isolated or derived from *Pyrococcus furiosus*, *Thermococcus litoralis*, and *Thermotoga maritime*, or modified versions thereof. They include both DNA-dependent polymerases and RNA-dependent polymerases such as reverse transcriptase. At least five families of DNA-dependent DNA polymerases are known, although most fall into families A, B and C. There is little or no sequence similarity among the various families. Most family A polymerases are single chain proteins that can contain multiple enzymatic functions including polymerase, 3' to 5' exonuclease activity and 5' to 3' exonuclease activity. Family B polymerases typically have a single catalytic domain with polymerase and 3' to 5' exonuclease activity, as well as accessory factors. Family C polymerases are typically multi-subunit proteins with polymerizing and 3' to 5' exonuclease activity. In *E. coli*, three types of DNA polymerases have been found, DNA polymerases I (family A), II (family B), and III (family C). In eukaryotic cells, three different family B polymerases—DNA polymerases α, δ, and ε—are implicated in nuclear replication, and a family A polymerase—polymerase γ—is used for mitochondrial DNA replication. Other types of DNA polymerases include phage polymerases. Similarly, RNA polymerases typically include eukaryotic RNA polymerases I, II, and III; and bacterial RNA polymerases as well as phage and viral polymerases. RNA polymerases can be DNA-dependent and RNA-dependent.

"Photoinitiator" refers to a compound that initiates a polymerization process after irradiation. The photoinitiator can generate acid (a photo-acid generator or PAG) or a radical, among other initiating species. The acid, radical, or other species then initiates a polymerization.

"Organic solvent" refers to water-miscible or -immiscible solvents capable of dissolving either or both of water-soluble and water-insoluble organic compounds.

"Photografting" refers to a process wherein electromagnetic radiation, typically having the wavelength of ultraviolet (UV) light, is used to initiate a polymerization reaction in which a monomer or polymer is grafted onto a polymer surface.

III. Polymer Surfaces

Polymer surfaces typically used in the fabrication of microfluidic devices are hydrophobic in nature. This property can be very advantageous for applications in which the microfluidic device is used to handle an aqueous phase being carried in a bulk organic phase. As an example, more hydrophobic surfaces will have weaker interactions with aqueous droplets present in an oil emulsion, providing less disruption to droplet integrity and morphology. Another result of this frequently strong hydrophobicity, however, is that the polymer surfaces are more likely to capture macromolecules or other compounds present in the aqueous phase. This can cause a change in concentration, or even loss, of the compound from the aqueous phase, interfering with the proper functioning of the microfluidic device. A buildup of such captured molecules can also clog, or foul, the passage, leading to restrictions in flow and decreases in efficiency. When the captured compound is a biological macromolecule, such as a protein, the phenomenon is referred to as biofouling. Such biofouling can also negatively impact the beneficial hydrophobicity of the polymer surface, rendering it more susceptible to undesired interactions with the aqueous phase. The provided polymer surfaces mitigate these occurrences through the covalent modification of polymer surface chemistry.

Several covalently modified polymer surfaces are provided herein. The polymer surfaces include a graft copolymer that includes a backbone polymer, a polyalkylene glycol acrylic side chain, and a halogenated acrylic side chain. In some embodiments, the halogenated acrylic side chain is a fluorinated acrylic side chain. The graft copolymer is a branched copolymer in which the main chain is the backbone polymer, and the polyalkylene glycol acrylic side chain and the halogenated acrylic side chain are branches appending off of this main chain.

The backbone polymer of the graft copolymer is typically selected to have properties beneficial for application in microfluidic devices. These can include high solvent resistance, low moisture adsorption, low dielectric loss, and adequate optical clarity. The backbone polymer of the graft copolymer can be, for example, polymethylmethacrylate (PMMA), polydimethylsiloxane (PDMS), polyethylene terephthalate (PET), polycarbonate (PC), polybutylene terephthalate, polyethylene, polypropylene (PP), cyclic olefin polymer (COP), or cyclic olefin copolymer (COC). In some embodiments, the backbone polymer is COP. In some embodiments, the backbone polymer is COC.

In some embodiments, the fluorinated acrylic side chain of the graft copolymer is selected for low surface energy, chemical resistance, and hydrophobicity, and can be in the form of a monomer or a polymer. The fluorinated acrylic side chain can include a fluorinated alkyl acrylate or a fluorinated alkyl methacrylate. The fluorinated acrylic side chain can include a perfluorinated alkyl acrylate or a perfluorinated alkyl methacrylate. The fluorinated acrylic side chain can include, for example, hexafluoroisopropyl acrylate, hexafluoroisopropyl methacrylate, hexafluorobutyl methacrylate, tetrafluoropropyl methacrylate, trifluoroethyl methacrylate, heptafluorobutyl acrylate, heptafluorobutyl methacrylate, pentafluoropropyl acrylate, octafluoropentyl methacrylate, pentafluoropropyl methacrylate, tridecafluorooctyl methacrylate, heptadecafluorodecyl methacrylate, tridecafluorooctyl acrylate, heneicosafluorododecyl acrylate, octafluoropentyl acrylate, dodecafluoroheptyl acrylate, hexafluorobutyl acrylate, pentafluorophenyl methacrylate, pentafluorophenyl acrylate, trifluoroethyl acrylate, perfluorodecyl acrylate, or derivatives or combinations thereof. In some embodiments, the fluorinated acrylic side chain includes 1H,1H,2H,2H-perfluorodecyl acrylate.

In some embodiments, the polyalkylene glycol acrylic side chain of the graft copolymer is selected for steric hindrance and hydrophilicity effects that can increase resistance to protein adhesion. The polyalkylene glycol acrylic side chain can be a polyalkylene glycol acrylate, a polyalkylene glycol methacrylate, or substituted derivatives thereof. The polyalkylene glycol acrylic side chain can be, for example, polyethylene glycol acrylate, propylene glycol acrylate, polybutylene glycol acrylate, polyethylene glycol methacrylate, polypropylene glycol methacrylate, polybutylene glycol methacrylate, or derivatives thereof. In some embodiments, the polyalkylene glycol acrylic side chain is polyethylene glycol acrylate.

The number average molecular weight of the polyalkylene glycol acrylic side chain of the graft copolymer can be within the range from 50 to 4800. The number average molecular weight of the polyalkylene glycol acrylic side chain can be within the range from 50 to 120, from 120 to 300, from 300 to 770, from 770 to 1900 or from 1900 to 4800. The number average molecular weight of the polyalkylene glycol acrylic side chain can be within the range from 150 to 240, from 240 to 370, from 370 to 620, from 620 to 960, or from 960 to 1500. In some embodiments, the number average molecular weight of the polyalkylene glycol acrylic side chain is within the range from 150 to 1500.

The mass ratio of fluorinated acrylic side chain to polyalkylene glycol acrylic side chain in the graft copolymer can be within the range from 1:10 to 10:1. For example, the mass ratio of fluorinated acrylic side chain to polyalkylene glycol acrylic side chain can be within the range from 1:10 to 1:3, from 1:3 to 1:1.4, from 1:1.4 to 1.4:1, from 1.4:1 to 3:1, or from 3:1 to 10:1. The mass ratio of fluorinated acrylic side chain to polyalkylene glycol acrylic side chain can be within the range from 1:3 to 1:1.9, from 1:1.9 to 1:1.2, from 1:1.2 to 1.2:1, from 1.2:1 to 1.9, or from 1.9:1 to 1.3. In some embodiments, the mass ratio of fluorinated acrylic side chain to polyalkylene glycol acrylic side chain is within the range from 1:3 to 3:1.

The water contact angle of the covalently modified polymer surface is a measure of the hydrophobicity of the surface. As discussed above, surfaces with more hydrophobic properties are more suitable for use with applications in which the integrity of an aqueous phase, such as that of a droplet, within a nonaqueous phase is to be maintained. The water contact angle of the covalently modified polymer surface can be greater than 94°, greater than 96°, greater than 98°, greater than 100°, greater than 102°, greater than 104°, greater than 106°, greater than 108°, greater than 110°, greater than 112°, greater than 114°, greater than 116°, greater than 118°, or greater than 120°. In some embodiments, the water contact angle of the covalently modified polymer surface is greater than 100°.

The biofouling of a polymer surface can negatively influence its desired hydrophobic properties. The specific configuration of the graft copolymer described herein can mitigate these biofouling effects when used to modify a polymer surface. A suitable test of the ability of a polymer surface to resist biofouling is to measure and compare the water contact angles of the surface both before and after exposure to a proteinaceous aqueous solution. For example, the surface can be exposed to an aqueous 1 mg/mL bovine serum albumin (BSA) solution or gelatin solution for a period of 1 hour, with the water contact angles prior to and subsequent to this exposure determined. As a result of the graft copolymer, upon exposure to this BSA or gelatin solution, the covalently modified polymer surface can exhibit a change in its water contact angle of less than 20°, less than 18°, less than 16°, less than 14°, less than 12°, less than 10°, less than 8°, less than 6°, less than 4°, or less than 2°. Any of the above changes in water contact angle can be observed upon exposure to the proteinaceous solution for at least 5 minutes, at least 10 minutes, at least 20 minutes, at least 30 minutes, at least 1 hour, at least 2 hours, at least 3 hours, at least 4 hours, at least 5 hours, at least 10 hours, at least 20 hours, or at least 1 day. In some embodiments, the covalently modified polymer has a water contact angle that changes by less than 10° upon exposure to an aqueous 1 mg/mL bovine serum albumin solution for 1 hour.

IV. Methods of Producing Polymer Surfaces

Also provided are methods for producing a covalently modified polymer surface. The methods include contacting a polymer surface with a mixture comprising a polyalkylene glycol acrylate, a fluorinated acrylic monomer, an organic solvent, and a photoinitiator. The methods further include exposing the polymer surface and mixture to ultraviolet (UV) radiation, such that the polymer surface is covalently modified.

The polymer surface of the method is typically selected to have properties beneficial for application in microfluidic devices. These can include increased solvent resistance, reduced moisture adsorption, low dielectric loss, and adequate optical clarity. The polymer surface can include, for example, polymethylmethacrylate (PMMA), polydimethylsiloxane (PDMS), polyethylene terephthalate (PET), polycarbonate (PC), polybutylene terephthalate, polyethylene, polypropylene (PP), cyclic olefin polymer (COP), or cyclic olefin copolymer (COC). In some embodiments, the polymer surface includes COP. In some embodiments, the polymer surface includes COC.

The polyalkylene glycol acrylate of the method is typically selected for steric hindrance and hydrophilicity effects that can increase resistance to protein adhesion. The polyalkylene glycol acrylate can be, for example, polyethylene glycol acrylate, propylene glycol acrylate, polybutylene glycol acrylate, or derivatives thereof. In some embodiments, the polyalkylene glycol acrylate is polyethylene glycol acrylate.

The number average molecular weight of the polyalkylene glycol acrylate of the method can be within the range from 50 to 4800. The number average molecular weight of the polyalkylene glycol acrylate can be within the range from 50 to 120, from 120 to 300, from 300 to 770, from 770 to 1900 or from 1900 to 4800. The number average molecular weight of the polyalkylene glycol acrylate can be within the range from 150 to 240, from 240 to 370, from 370 to 620, from 620 to 960, or from 960 to 1500. In some embodiments, the number average molecular weight of the polyalkylene glycol acrylate is within the range from 150 to 1500.

The fluorinated acrylic monomer of the method is typically selected for low surface energy, chemical resistance, and hydrophobicity. The fluorinated acrylic monomer can be a fluorinated alkyl acrylate or a fluorinated alkyl methacrylate. The fluorinated acrylic monomer can be a perfluorinated alkyl acrylate or a perfluorinated alkyl methacrylate. The fluorinated acrylic monomer can be, for example, hexafluoroisopropyl acrylate, hexafluoroisopropyl methacrylate, hexafluorobutyl methacrylate, tetrafluoropropyl methacrylate, trifluoroethyl methacrylate, heptafluorobutyl acrylate, heptafluorobutyl methacrylate, pentafluoropropyl acrylate, octafluoropentyl methacrylate, pentafluoropropyl methacrylate, tridecafluorooctyl methacrylate, heptadecafluorodecyl methacrylate, tridecafluorooctyl acrylate, heneicosafluorododecyl acrylate, octafluoropentyl acrylate, dodecafluoroheptyl acrylate, hexafluorobutyl acrylate, pentafluorophenyl methacrylate, pentafluorophenyl acrylate, trifluoroethyl acrylate, perfluorodecyl acrylate, or derivatives thereof. In some embodiments, the fluorinated acrylic monomer is 1H,1H,2H,2H-perfluorodecyl acrylate.

The mass ratio of fluorinated acrylic monomer to polyalkylene glycol acrylate of the method can be within the range from 1:10 to 10:1. The mass ratio of fluorinated acrylic monomer to polyalkylene glycol acrylate can be within the range from 1:10 to 1:3, from 1:3 to 1:1.4, from 1:1.4 to 1.4:1, from 1.4:1 to 3:1, or from 3:1 to 10:1. The mass ratio of fluorinated acrylic monomer to polyalkylene glycol acrylate can be within the range from 1:3 to 1:1.9, from 1:1.9 to 1:1.2, from 1:1.2 to 1.2:1, from 1.2:1 to 1.9, or from 1.9:1 to 1.3. In some embodiments, the mass ratio of fluorinated acrylic monomer to polyalkylene glycol acrylate is within the range from 1:3 to 3:1.

The organic solvent of the method is selected for its ability to effectively solubilize the polyalkylene glycol acrylate and/or the fluorinated acrylic monomer. The organic solvent can further be selected to have low absorbance of electromagnetic radiation in the UV range. The organic solvent can further be selected to minimize hydrogen abstraction, and the resulting incorporation of the solvent into the polymer surface through, for example, a termination reaction. The organic solvent can be a porogenic solvent capable of increasing the porosity and/or reactive site availability of the polymer surface. The organic solvent can include an alcohol, such as for example, ethanol, methanol, decanol, tert-butanol, cyclohexanol, butanediol, or derivatives thereof. The organic solvent can include an ether, such as for example, dioxane, tetrahydrofuran (THF), methyl tert-butyl ether (MTBE), or derivatives thereof. The organic solvent can include a ketone, such as for example, acetone or derivatives thereof. The organic solvent can include a nitrile, such as for example, acetonitrile or derivatives thereof. The organic solvent can include an alkane, such as for example, hexane or derivatives thereof. The organic solvent can include a benzene derivative, such as for example, toluene, chlorobenzene, or derivatives thereof. The organic solvent can include a formamide derivative, such as for example, dimethylformamide (DMF). The organic solvent can include a combination of two or more solvents, or a combination of one or more solvents and water. In some embodiments, the organic solvent includes acetone. In some embodiments, the organic solvent includes 3-ethoxy-1,1,1, 2,3,4,4,5,5,6,6,6-dodecafluoro-2-trifluoromethyl-hexane, commercially available as NOVEC 7500. In some embodiments, the organic solvent includes acetone and 3-ethoxy-1,1,1,2,3,4,4,5,5,6,6,6-dodecafluoro-2-trifluoromethyl-hexane.

The photoinitiator of the method is selected for its ability to abstract hydrogen from the polymer surface upon exposure to UV light. The photoinitiator can be, for example, benzophenone, 2,2-dimethoxy-2-phenylacetophenone, dimethoxyacetophenone, xanthone, tioxanthone, or derivatives or mixtures thereof. In some embodiments, the photoinitiator includes benzophenone. The concentration of the photoinitiator in the mixture of the method can be within the range from 40 mg/mL to 4 g/ml. The concentration of the photoinitiator can be within the range from 40 mg/L to 100 mg/L, from 100 mg/L to 250 mg/mL, from 250 mg/L to 640 mg/mL, from 640 mg/L to 1.6 g/mL, or from 1.6 g/mL to 4 g/mL. The concentration of the photoinitiator can be within the range from 125 mg/L to 200 mg/mL, from 200 mg/mL to 300 mg/mL, from 300 mg/mL to 520 mg/mL, from 520 mg/mL to 800 mg/mL, or from 800 mg/mL to 1.3 g/mL. In some embodiments, the concentration of the photoinitiator in the mixture of the method is within the range from 125 mg/mL to 1.3 g/mL. A surfactant can be added to the mixture to increase the solubility of one or more of the photoinitiator, fluorinated acrylic monomer, or polyalkylene glycol acrylate.

To covalently modify the polymer surface, the surface and mixture are exposed to UV radiation, initiating a photografting reaction. The wavelength of the UV radiation can be within the range from 100 nm to 400 nm. The wavelength of the UV radiation can be within the range from 100 nm to 175 nm, from 175 nm to 250 nm, from 250 nm to 325 nm, or from 325 nm to 400 nm. The wavelength of the UV radiation can be within the range from 325 nm to 350 nm, from 350 nm to 375 nm, or from 375 nm to 400 nm. In some embodiments, the wavelength of the UV radiation that initiates the photografting of the method is within the range from 325 nm to 400 nm.

The power of the UV radiation that initiates the photografting of the method can be within the range from 0.25 mW to 25 mW. The power of the UV radiation can be within the range from 0.25 mW to 0.65 mW, from 0.65 mW to 1.55 mW, from 1.55 mW to 4 mW, from 4 mW to 10 mW, or from 10 mW to 25 mW. The power of the UV radiation can be within the range from 0.8 mW to 1.25 mW, from 1.25 mW to 1.9 mW, from 1.9 mW to 3.25 mW, from 3.25 mW to 5 mW, or from 5 mW to 8 mW. In some embodiments, the power of the UV radiation that initiates the photografting of the method is within the range from 0.8 mW to 8 mW.

The exposure time of the UV radiation that initiates the photografting of the method can be less than 20 seconds. The exposure time of the UV radiation can be within the range from 20 seconds to 45 seconds, from 45 seconds to 2 minutes, from 2 minutes to 5 minutes, from 5 minutes to 12 minutes, or from 12 minutes to 30 minutes. The exposure time of the UV radiation that initiates the photografting of the method can be greater than 30 minutes.

The UV irradiation can be applied in a localized fashion, modifying the surface polymer at some regions or positions, while leaving others in their unmodified state. In this way, polymer surfaces can be produced that have, for example, different degrees of hydrophobicity and hydrophilicity at different locations. Polymer surfaces can similarly be produced that have different degrees of biofouling resistance at different locations.

V. Microfluidic Devices and Methods

As discussed above, the covalently modified polymer surfaces described herein are particularly useful elements for the fabrication of microfluidic devices that handle emulsions with distinct aqueous and nonaqueous phases. Accordingly, also provided are microfluidic channels having an interior polymer surface. The interior polymer surface includes a graft copolymer that includes a backbone polymer, a polyalkylene glycol acrylic side chain, and a fluorinated acrylic side chain. Further provided are microfluidic devices that include such a microfluidic channel. In some embodiments, substantially all of the microfluidic channels or microfluidic channel regions of a microfluidic device include a covalently modified polymer surface as described herein. In some embodiments, a portion of the microfluidic channels or microfluidic channel regions of a microfluidic device include a covalently modified polymer surface as described herein.

Also provided are methods for moving an emulsion of droplets through a microfluidic channel. The method includes providing a microfluidic device, wherein the microfluidic device includes a microfluidic channel. The microfluidic channel includes an interior surface, wherein the interior surface includes a covalently modified polymer surface. The covalently modified polymer surface includes a graft copolymer, wherein the graft copolymer includes a backbone polymer, a polyalkylene glycol acrylic side chain, and a fluorinated acrylic side chain. The method further includes providing an emulsion, wherein the emulsion includes droplets and an emulsion fluid. The method further includes providing a force sufficient to move the emulsion through the microfluidic channel of the microfluidic device.

The emulsions of the method are common in, for example, applications such as DNA sequencing, in which an individual polymerase chain reaction (PCR) can be carried out in each or several distinct aqueous droplets of a water-oil emulsion. Exemplary DNA sequencing applications include digital PCR or droplet digital PCR (DDPCR). The emulsions of the method can be water-oil emulsions. The emulsions can include two phases, or more than two phases. The method can also be applied to applications including multiple emulsions, each of which can have two or more phases. The compositions of different phases in different emulsions can be identical, similar, or different. The emulsions can have additional components, including one or more surfactant, reagent, sample, label, particle, or combinations thereof. In some embodiments, the oil is or includes at least one silicone oil, mineral oil, fluorocarbon or fluorinated oil, vegetable oil, or a combination thereof, among others.

Emulsions can be characterized by a predominant liquid compound or type of liquid compound in each phase. In some embodiments, the predominant liquid compounds in the emulsion are water and oil. In some embodiments, the emulsion comprises droplets of the aqueous phase disposed in a nonaqueous continuous phase. In some embodiments, an emulsion is formed comprising droplets of the nonaqueous phase disposed in an aqueous continuous phase. In some embodiments, an interfacial skin is created between each droplet and the continuous phase, to transform the droplets into capsules. In some embodiments, the provided aqueous phase includes skin-forming proteins and at least one surfactant. In some embodiments, the emulsion further includes a spacing fluid that is miscible with the continuous phase and has a different composition than that of the continuous phase. Exemplary descriptions of DDPCR emulsion components can be found in U.S. patent application No. 2014/0302503, which is entirely incorporated herein by reference for all purposes. Exemplary descriptions of emulsion formation methods can be found in U.S. patent application No. 2012/0152369, which is entirely incorporated herein by reference for all purposes. Any of the emulsions disclosed herein can be monodisperse—composed of droplets of at least generally uniform size—or can be polydisperse—composed of droplets of various sizes. Droplets generated from an orifice similarly can be monodisperse or polydisperse.

At least a portion of the droplets of the emulsion can include nucleic acids. At least a portion of the droplets can include reagents sufficient for a PCR. The reagents for PCR can include a polymerase enzyme. Any suitable PCR technology or combination of technologies can be utilized with the devices and methods disclosed herein. These PCR technologies include allele-specific PCR, assembly PCR, asymmetric PCR, digital PCR, endpoint PCR, hot-start PCR, in situ PCR, intersequence-specific PCR, inverse PCR, linear after exponential PCR, ligation-mediated PCR, methylation-specific PCR, miniprimer PCR, multiplex ligation-dependent probe amplification, multiplex PCR, nested PCR, overlap extension PCR, polymerase cycling assembly, qualitative PCR, quantitative PCR, real-time PCR, RT-PCR, single-cell PCR, solid-phase PCR, thermal asymmetric interlaced PCR, touchdown PCR, or universal fast walking PCR, among others.

At least a portion of the droplets of the emulsion can include an enzyme or other reagents sufficient for reactions other than PCR. Any suitable enzyme-catalyzed reactions can be performed with the devices and methods disclosed herein. For example, the reactions can be catalyzed by a kinase, nuclease, nucleotide cyclase, nucleotide ligase, nucleotide phosphodiesterase, polymerase (DNA or RNA), phenyl transferase, pyrophospatase, reporter enzyme (e.g., alkaline phosphatase, beta-galactosidase, chloramphenicol acetyl transferase, glucuronidase, horse radish peroxidase, luciferase, etc.), reverse transcriptase, topoisomerase, or other.

VI. Examples

Example 1. Covalent Modification of Polymer Surfaces with Graft Copolymers

Solutions of perfluorodecyl acrylate in acetone and 480 Da polyethylene glycol acrylate in acetone were prepared, each having a concentration of 33% v/v. Mixtures of perfluorodecyl acrylate and polyethylene glycol acrylate were then generated by combining the respective solutions in different proportions to total volumes of 1 mL. The generated mixtures had 0, 25, 50, 75, and 100 mass percentages of perfluorodecyl acrylate relative to the total of the perfluorodecyl acrylate and polyethylene glycol acrylate. To each mixture was added 0.4 g/mL benzophenone photoinitiator Each of five COC substrates were contacted with a mixture having a different percentage of perfluorodecyl acrylate, and exposed to 365 nm UV radiation for 2 minutes at a dosage of 2-3 mW. The surfaces were rinsed with acetone and then water.

The water contact angle of each surface was then measured in triplicate using 2.5 μL water for each measurement, with results as shown in FIG. 1. From the graph, it can be seen that the polymer surfaces that were photografted with a copolymer having side chains that were a blend of perfluorodecyl acrylate and polyethylene glycol acrylate side chains, rather than uniformly perfluorodecyl acrylate or polyethylene glycol acrylate, demonstrated higher hydrophobicities. In these cases, the water contact angles were greater than 100°.

Example 2. Resistance of Covalently Modified Polymer Surfaces to Biofouling

Figure 2:
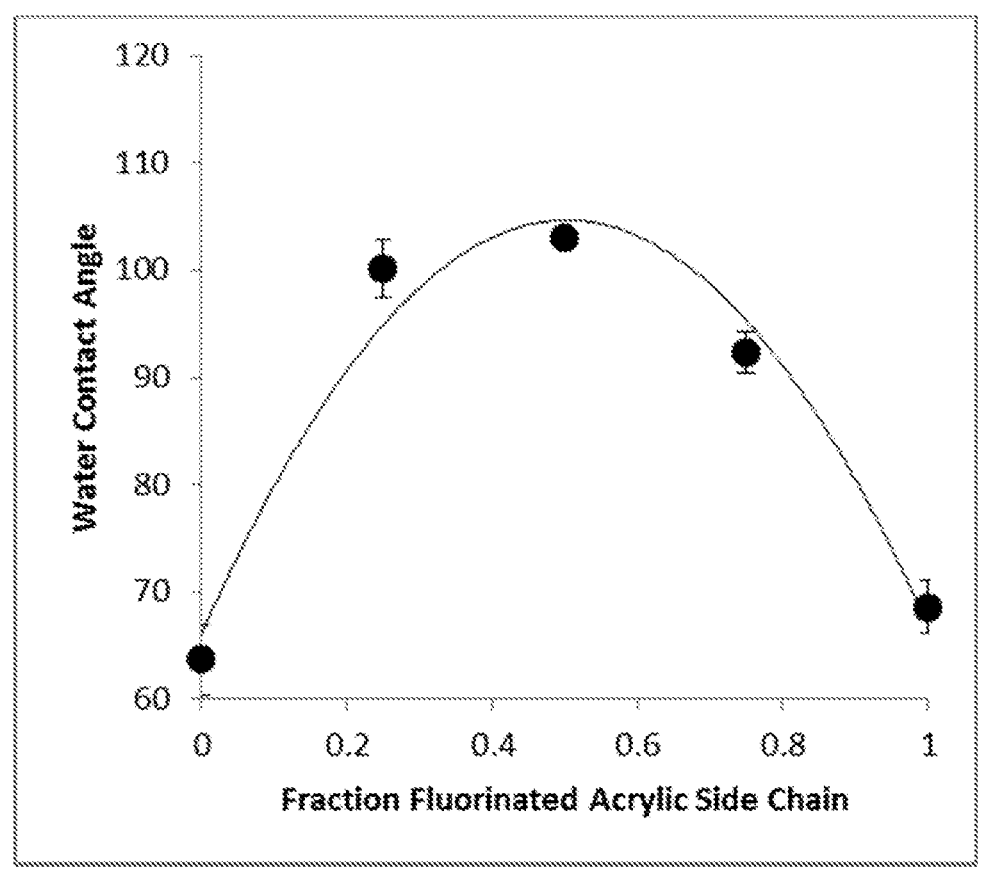
FIG. 2 is a graph of the water contact angles for the polymer surfaces of FIG. 1 subsequent to exposure of the surfaces to 1 mg/mL gelatin for 1 hour. Each point on the graph represents a surface having a different fraction of its graft copolymer side chains as fluorinated acrylic side chains. Error bars represent standard deviations of triplicate measurements for each surface.
Figure 3:
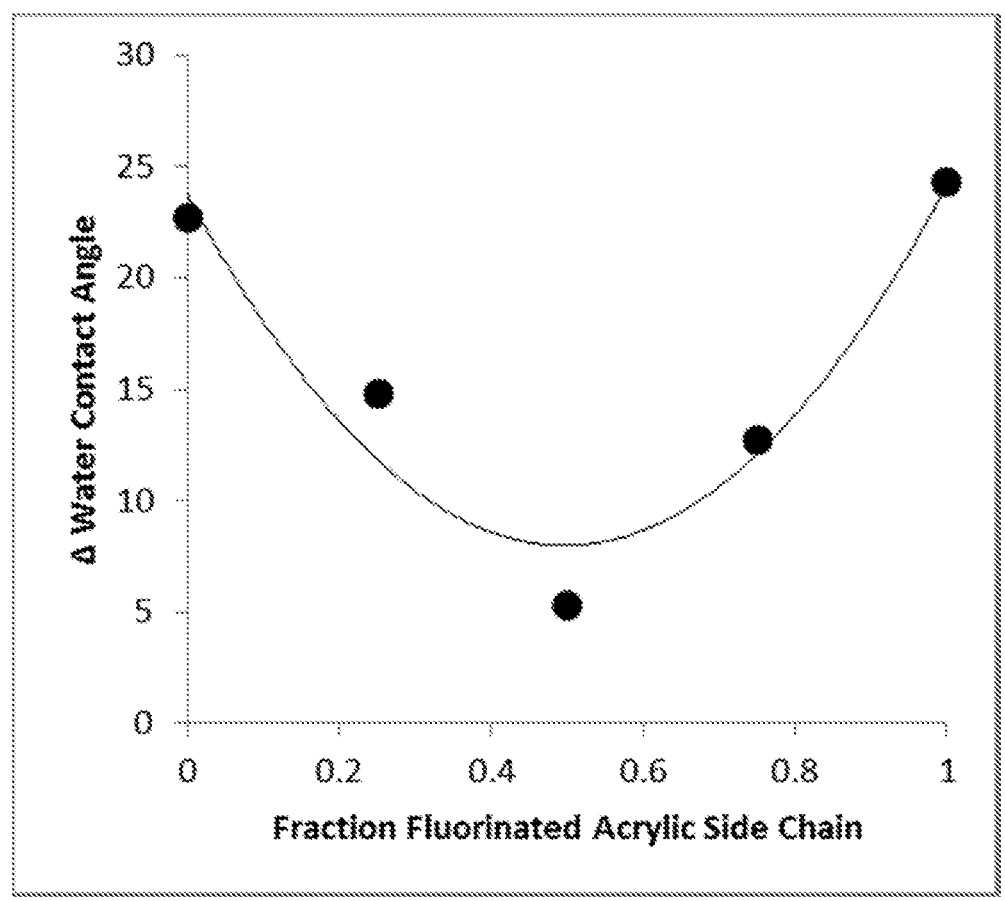
FIG. 3 is a graph of the difference between the contact angle measurements of FIG. 1 and FIG. 2. Each point on the graph represents a surface having a different fraction of its graft copolymer side chains as fluorinated acrylic side chains.

The covalently modified polymer surfaces of Example 1 were each contacted with an aqueous 1 mg/mL gelatin solution for 1 hour. After this exposure, the surfaces were washed with water and then blown dry. The water contact angle of each surface was then measured in triplicate using 2.5 μL water for each measurement, with results as shown in FIG. 2. From the graph, it can be seen that once again the polymer surfaces that were photografted with a copolymer having side chains that were a blend of perfluorodecyl acrylate and polyethylene glycol acrylate side chains, rather than uniformly perfluorodecyl acrylate or polyethylene glycol acrylate, demonstrated higher hydrophobicities. In each case, the exposure of the surface to the proteinaceous solution resulted in a decrease in the hydrophobicity of the surface. This decrease, however, was greatest for the surfaces having copolymers with uniformly perfluorodecyl acrylate or polyethylene glycol acrylate side chains. For surfaces having copolymers with a blend of perfluorodecyl acrylate and polyethylene glycol acrylate side chains, the changes in water contact angle upon exposure to the proteinaceous solution was much smaller. FIG. 3 provides a graphical representation of these differences in water contact angles prior and subsequent to exposure to the gelatin solution.

Additional tests were also carried out of the biofouling resistance of polymer surfaces covalently modified as in Example 1, but with perfluoroheptyl acrylate used as the fluorinated acrylic monomer. Results from these tests demonstrated that perfluoroheptyl acrylate provided biofouling protection that was qualitatively equivalent to that provided by perfluorodecyl acrylate.

In some embodiments, the devices and methods described herein are operated in an automated fashion, with steps carried out by a machine or computer without direct human control. In some embodiments, the automated method has subjective start and end points, thus the term does not imply that all steps of the operation are carried out automatically. In some embodiments, a computing apparatus is programmed or otherwise configured to automate and/or regulate one or more steps of the methods provided herein. Some embodiments provide machine executable code in a non-transitory storage medium that, when executed by a computing apparatus, implements any of the methods described herein.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A covalently modified polymer surface comprising a graft copolymer, wherein the graft copolymer comprises a backbone polymer, a polyalkylene glycol acrylic side chain, and a fluorinated acrylic side chain; wherein the covalently modified polymer surface has a water contact angle of greater than 100°; wherein the water contact angle changes by less than 10° upon exposure to an aqueous 1 mg/mL bovine serum albumin solution for 1 hour; and wherein the mass ratio of fluorinated acrylic side chain to polyalkylene glycol acrylic side chain in the graft copolymer ranges from 1:3 to 3:1.

2. The covalently modified polymer surface of claim 1, wherein the backbone polymer is a cyclic olefin polymer (COP) or cyclic olefin copolymer (COC).

3. The covalently modified polymer surface of claim 1, wherein the fluorinated acrylic side chain comprises a perfluorinated alkyl acrylate or a perfluorinated alkyl methacrylate.

4. The covalently modified polymer surface of claim 1, wherein the fluorinated acrylic side chain comprises 1H,1H,2H,2H-perfluorodecyl acrylate.

5. The covalently modified polymer surface of claim 1, wherein the polyalkylene glycol acrylic side chain comprises polyethylene glycol acrylate.

6. The covalently modified polymer surface of claim 1, wherein the number average molecular weight of the polyalkylene glycol acrylic side chain ranges from 150 to 1500.

7. The covalently modified polymer surface of claim 1, wherein the backbone polymer is a COC, wherein the polyalkylene glycol acrylic side chain comprises polyethylene glycol acrylate, and wherein the fluorinated acrylic side chain comprises a perfluorinated alkyl acrylate.

8. A method of moving an emulsion of droplets through a microfluidic channel, the method comprising:
providing a device comprising a microfluidic channel having an interior surface, wherein the interior surface comprises the covalently modified polymer surface of claim 1;
providing an emulsion comprising droplets and an emulsion fluid; and
providing a force to move the emulsion through the microfluidic channel of the device.

9. The method of claim 8, wherein the droplets are aqueous droplets comprising nucleic acids and reagents for a polymerase chain reaction.

10. The method of claim 8, wherein the emulsion fluid comprises a fluorinated oil or a silicone oil.

11. A method for producing the covalently modified polymer surface of claim 1, the method comprising:
contacting the backbone polymer with a mixture comprising a polyalkylene glycol acrylate, a fluorinated acrylic monomer, an organic solvent, and a photoinitiator; and
exposing the backbone polymer and the mixture to ultraviolet (UV) radiation to covalently modified the backbone polymer.

12. The method of claim 11, wherein the polymer surface comprises a COC, wherein the polyalkylene glycol acrylate is a polyethylene glycol acrylate, and wherein the fluorinated acrylic monomer is a perfluorinated alkyl acrylate.

13. The method of claim 11, wherein the organic solvent comprises acetone.

14. The method of claim 11, wherein the mixture further comprises 3-ethoxy-1,1,1,2,3,4,4,5,5,6,6,6-dodecafluoro-2-trifluoromethyl-hexane.

15. The method of claim 11, wherein the photoinitiator comprises benzophenone.

16. The method of claim 11, wherein the concentration of the photoinitiator in the mixture ranges from 125 mg/mL to 1.3 g/mL.

17. The method of claim 11, wherein the UV radiation has a wavelength ranging from 325 nm to 400 nm.

18. The method of claim 11, wherein the UV radiation has a dose ranging from 0.8 mW to 8 mW.

19. The method of claim 11 wherein the polymer surface is the interior surface of a microfluidic channel.

* * * * *